United States Patent
Takahashi

(10) Patent No.: US 7,139,307 B2
(45) Date of Patent: *Nov. 21, 2006

(54) RADIO RECEIVER

(75) Inventor: Hideyuki Takahashi, Yokosuka (JP)

(73) Assignee: Matsushita Electric Industrial, Co., Ltd., Osaka (JP)

(*) Notice: Subject to any disclaimer, the term of this patent is extended or adjusted under 35 U.S.C. 154(b) by 810 days.

This patent is subject to a terminal disclaimer.

(21) Appl. No.: 10/111,455

(22) PCT Filed: Aug. 29, 2001

(86) PCT No.: PCT/JP01/07402

§ 371 (c)(1),
(2), (4) Date: Apr. 25, 2002

(87) PCT Pub. No.: WO02/19559

PCT Pub. Date: Mar. 7, 2002

(65) Prior Publication Data

US 2003/0043891 A1    Mar. 6, 2003

(30) Foreign Application Priority Data

Aug. 30, 2000 (JP) .............................. 2000-261816

(51) Int. Cl.
H04B 1/707 (2006.01)
H04B 7/10 (2006.01)

(52) U.S. Cl. ...................................... 375/148; 375/347

(58) Field of Classification Search ................ 375/148, 375/347
See application file for complete search history.

(56) References Cited

U.S. PATENT DOCUMENTS

| 5,329,547 | A | 7/1994 | Ling |
| 5,619,524 | A | 4/1997 | Ling et al. |
| 6,449,245 | B1 * | 9/2002 | Ikeda et al. ................. 370/208 |
| 6,608,858 | B1 * | 8/2003 | Sih et al. .................... 375/147 |
| 6,724,835 | B1 * | 4/2004 | Shenoi ....................... 375/326 |

FOREIGN PATENT DOCUMENTS

| CN | 1248362 | 3/2000 |
| EP | 0942565 | 9/1999 |
| EP | 0984576 | 3/2000 |
| JP | 06209304 | 7/1994 |
| JP | 07115387 | 5/1995 |
| JP | 08293851 | 11/1996 |
| JP | 10303996 | 11/1998 |

(Continued)

OTHER PUBLICATIONS

Supplementary European Search Report dated Dec. 1, 2004.

(Continued)

*Primary Examiner*—Kevin Kim
(74) *Attorney, Agent, or Firm*—Stevens, Davis, Miller & Mosher, LLP

(57) ABSTRACT

A despreader 106 (107) provides despread processing to baseband signals based on timing from a searcher 105 to obtain a baseband signal of path 1 (path 2). A complex correlation section 115 (116) provides complex correlation processing to the baseband signals from the despreader 106(107) (baseband signals, which are not yet multiplied by an inverse characteristic of a channel estimation value from a channel estimating section 108). A path combining section 117 combines the signals subjected to complex correlation processing by the complex correlation sections 115 and 116. A phase estimating section 118 estimates a phase rotation amount caused by a frequency offset using the signal combined by the path combining section 117.

9 Claims, 13 Drawing Sheets

FOREIGN PATENT DOCUMENTS

| | | |
|---|---|---|
| JP | 11088229 | 3/1999 |
| JP | 11507483 | 6/1999 |
| JP | 11196146 | 7/1999 |
| JP | 11261525 | 9/1999 |
| JP | 2000106535 | 4/2000 |
| JP | 2000115056 | 4/2000 |
| WO | 9510891 | 4/1995 |
| WO | 0038343 | 6/2000 |

OTHER PUBLICATIONS

Mauss, O. C. et al., "Carrier Frequency Recovery for a Fully Digital Direct-Sequence Spread-Spectrum Receiver: A Comparison," Personal Communication—Freedom Through Wireless Technology, Proceedings of the Vehicular Technology Conference, New York, IEEE, vol. CONF. 43, pp. 392-395, XP000393204, ISBN: 0-7803-1267-8, May 18, 1993.

* cited by examiner

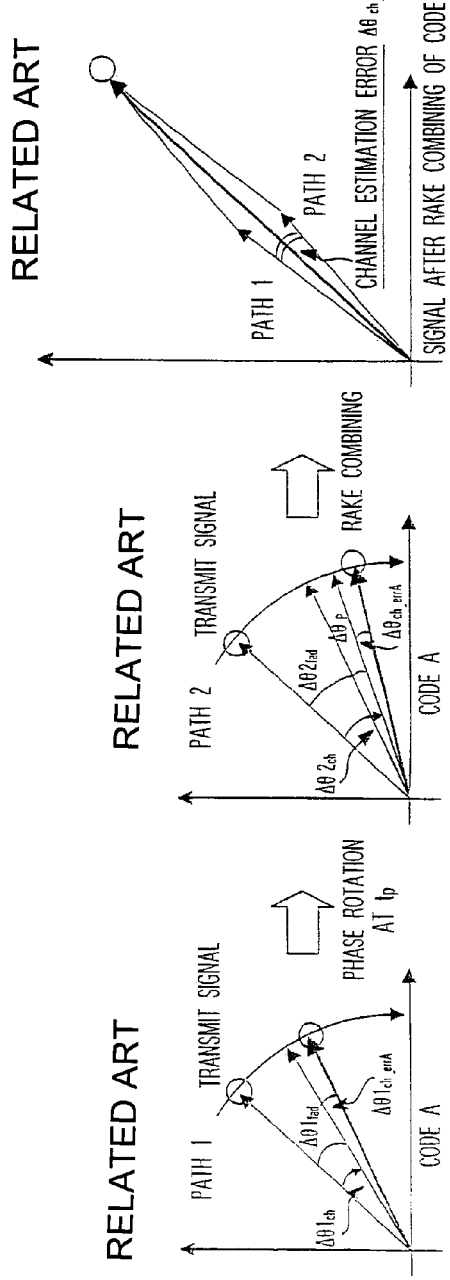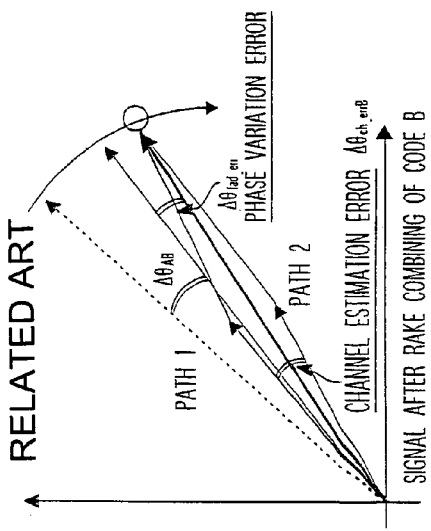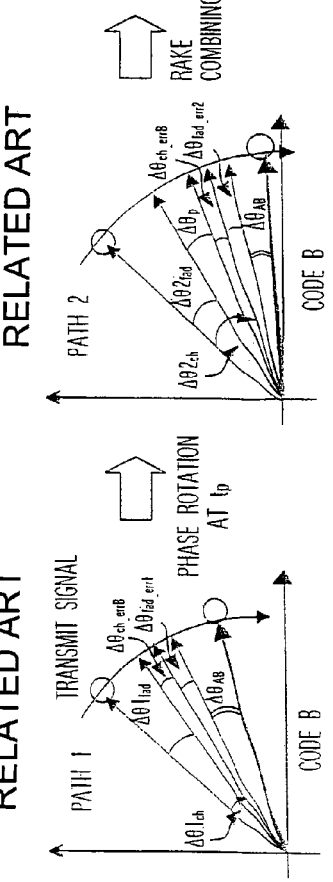

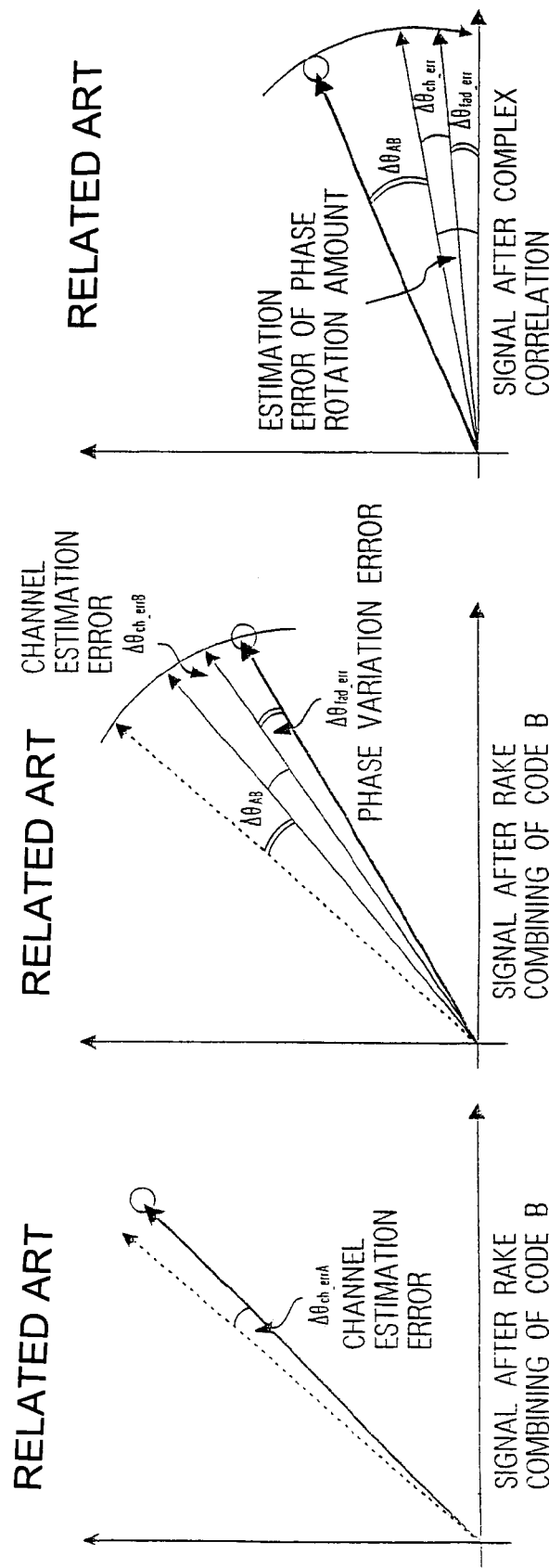

RADIO RECEIVER

TECHNICAL FIELD

The present invention relates to a radio receiving apparatus and more particularly to a radio receiving apparatus that compensates for a frequency offset.

BACKGROUND ART

Conventionally, a receiver-side apparatus performs processing (hereinafter referred to as "frequency offset compensation) for compensating for a carrier frequency drift between a transmitter-side apparatus (for example, base station apparatus) and a receiver-side apparatus (for example, communication terminal apparatus).

The following will explain the radio receiving apparatus that performs a conventional frequency offset compensation with reference to FIG. 1, FIG. 2, and FIG. 3. FIG. 1 is a schematic view showing a state of a known symbol transmitted to the radio receiving apparatus that performs a frequency offset compensation. FIG. 2 is a block diagram showing a configuration of the radio receiving apparatus that performs a conventional frequency offset compensation. FIG. 3 is a schematic view showing a timing state of a known symbol of a path received by the radio receiving apparatus that performs a conventional frequency offset compensation.

The transmitter-side apparatus (not shown) transmits a signal including a known symbol 11 spread with Code A and a known symbol 12 spread with Code B. In this case, it is assumed that a length of Code A and a length of Code B are set to tCA and tCB, respectively, and that a distance between the known symbol 11 and known symbol 12 is set to tgap.

The signal transmitted from the transmitter-side apparatus is received via an antenna 21 by a radio receiving apparatus shown in FIG. 2. In FIG. 2, a signal received (received signal) by the antenna 21 is converted into a baseband signal from a carrier frequency signal by a reception RF section 22. At this time, a local signal sent from a crystal oscillator 38 (to be described later) is used at the reception RF section 22. An in-phase component (I-ch) of the baseband signal and a quadrature phase component (Q-ch) thereof are output to an A/D converter 23 and an A/D converter 24 from the reception RF section 22, respectively.

The baseband signal with I-ch and the baseband signal with Q-ch are converted into digital signals by the A/converter 23 and A/D converter 24, respectively. The baseband signal with I-ch and the baseband signal with Q-ch, which are converted into digital signals, are output to a searcher 25, a despreader 26, and a despreader 27.

The searcher 25 examines the correlation between the baseband signal converted to the digital signal and Code A, which is the known code, to detect a code timing (namely, timing of each path) with which power of a correlation value reaches a maximum value as illustrated in FIG. 3. The searcher 25 also detects timing of Code B using the detected code timing. For example, if a timing difference between path 1 of Code A and path 2 thereof is set to tp, timing of code B of path 1 becomes tA+tgap, and timing of Code B of path 2 becomes tA+Tgap+tp. Thus, timing of Code B is also calculated based on the detected timing of Code A. In this way, despread timing at the despreaders 26 and 27, pilot timing at a channel estimating section 28 and path timing at a RAKE combining section 29 are calculated by the searcher 25.

Timing of Code A and Code B of path 1 is output to the despreader 26 from the searcher 25, and timing of Code A and Code B of path 2 is output to the despreader 27 from the searcher 25. Timing of Code A and Code B of path 1, and timing of Code A and Code B of path 2 are output to the channel estimating section 28 from the searcher 25. Moreover, timing of path 1 and timing of path 2 are output to the RAKE combining section 29 from the searcher 25.

The despreader 26 provides despread processing using Code A and Code B to the baseband signal with I-ch based on timing of Code A and Code B of path 1 from the searcher 25. Similarly, the despreader 26 provides despread processing to the baseband signal with Q-ch using Code A and Code B based on timing of Code A and Code B of path 1 from the searcher 25, respectively. Moreover, the despreader 26 provides despread processing to the baseband signals with I-ch and Q-ch using a predetermined spreading code (spreading code assigned to the present radio receiving apparatus). The baseband signals with I-ch and Q-ch subjected to despread processing are output to the channel estimating section 28 and RAKE combining section 29.

The despreader 27 provides despread processing using Code A and Code B to the baseband signal with I-ch based on timing of Code A and Code B of path 2 from the searcher 25. Similarly, the despreader 27 provides despread processing to the baseband signal with Q-ch using Code A and Code B based on timing of Code A and Code B of path 2 from the searcher 25, respectively. Moreover, the despreader 27 provides despread processing to the baseband signals with I-ch and Q-ch using a predetermined spreading code. The baseband signals with I-ch and Q-ch subjected to despread processing are output to the channel estimating section 28 and RAKE combining section 29.

The channel estimating section 28 extracts a signal, which corresponds to the known symbol 11 and known symbol 12, from among baseband signals with I-ch and Q-ch subjected to spread processing from the despreader 26 based on timing of Code A and Code B of path 1 from the searcher 25. A channel estimation value of path 1 is calculated using this extracted signal. Likewise, the channel estimating section 28 extracts a signal, which corresponds to the known symbol 11 and known symbol 12, from among baseband signals with I-ch and Q-ch subjected to spread processing from the despreader 27 based on timing of Code A and Code B of path 2 from the searcher 25. A channel estimation value of path 2 is calculated using this extracted signal. The channel estimation values of path 1 and path 2 calculated by the channel estimating section 28 are output to the RAKE combining section 29.

The RAKE combining section 29 multiplies the baseband signal with I-ch and Q-ch subjected to despread processing from the despreader 26 by an inverse characteristic of the channel estimation value of path 1 from the channel estimating section 28. The RAKE combining section 29 multiplies the baseband signal with I-ch and Q-ch subjected to despread processing from the despreader 27 by an inverse characteristic of the channel estimation value of path 2 from the channel estimating section 28. Moreover, the RAKE combining section 29 RAKE combines the despread baseband signal with I-ch and Q-ch of path 1 multiplied by the inverse characteristic of channel estimation value with the despread baseband signal with I-ch and Q-ch of path 2 multiplied by the inverse characteristic of channel estimation value based on timing of path 1 and path 2 from the searcher 25.

The baseband signal with I-ch and Q-ch subjected to RAKE combining is output to a modulating section 30. The modulating section 30 provides demodulation processing to the baseband signal with I-ch and Q-ch subjected to RAKE combining, whereby obtaining received data.

The baseband signal with I-ch subjected to RAKE combining is output to a complex correlation calculating section 33. Also, after the baseband signal with I-ch subjected to RAKE combining is delayed by tAB (=tCA/2+tgap+tCB/2; see FIG. 1) by a delay section 31, and the resultant is output to the complex correlation calculating section 33. Similarly, the baseband signal with Q-ch subjected to RAKE combining is output to a complex correlation calculating section 33. Likewise, after the baseband signal with Q-ch subjected to RAKE combining is delayed by tAB by a delay section 32, and the resultant is output to the complex correlation calculating section 33.

The complex correlation calculating section 33 performs complex correlation processing using the baseband signal with I-ch subjected to RAKE combining from the RAKE combining 29 and the baseband signal with I-ch subjected to RAKE combining and delayed by tAB from the delay section 31. Moreover, the complex correlation calculating section 33 performs complex correlation processing using the baseband signal with Q-ch subjected to RAKE combining from the RAKE combining 29 and the baseband signal with Q-ch subjected to RAKE combining and delayed by tAB from the delay section 32. The signals with I-ch and Q-ch subjected to complex correlation processing are output to a phase estimating section 34.

The phase estimating section 34 calculates a phase rotation amount per unit time using the signals with I-ch and Q-ch, which are subjected to complex correlation processing and which are sent from the complex correlation calculating section 33. A smoothing section 35 calculates a frequency offset using the phase rotation amount calculated by the phase calculating section 34. The calculated frequency offset is output to a control voltage converting section 36.

The voltage converting section 36 converts the calculated frequency offset into a control voltage to the crystal oscillator 38. This control voltage is converted into an analog signal by a D/A converter 37, and the resultant is output to the crystal oscillator 38. In this way, the frequency of local signal is controlled at the crystal oscillator 38. The frequency offset compensation is thus carried out.

However, the conventional radio receiving apparatus that performs the frequency offset compensation has the following problem. Namely, in the conventional radio receiving apparatus that performs the frequency offset compensation, since the phase rotation amount is estimated using the baseband signals subjected to RAKE combining, there is a problem in which accuracy of phase rotation amount to be estimated is decreased particularly when Dopplar frequency caused by high-speed moving becomes high.

For example, as illustrated in FIG. 4, a channel estimation value is calculated using a known symbol placed at the central portion of the slot. In a case where the use of this channel estimation value is shared in the slot, accuracy of the channel estimation value deteriorates with distance from the channel estimation segment, so that accuracy of the baseband signals subjected to RAKE combining deteriorates. As a result, accuracy of phase rotation amount to be estimated is decreased. In other words, accuracy of phase rotation amount to be estimated depends on accuracy of channel estimation using the baseband signals subjected to RAKE combining.

The factors that decrease accuracy of the phase rotation amount to be estimated will be explained with reference to FIGS. 5A, 5B, 5C, 5D, 5E, 5F, 6A, 6B, and 6C.

FIG. 5A is a schematic view showing a state of the phase rotation amount of the baseband signal obtained by despread processing using Code A of path 1. FIG. 5B is a schematic view showing a state of the phase rotation amount of the baseband signal obtained by despread processing using Code B of path 1.

As illustrated in FIGS. 5A and 5B, since channel estimation of path 1 is carried out on a path-by-path basis by the channel estimating section 28, a channel estimation value obtained using Code A and a channel estimation value obtained using Code B are substantially the same as each other ($\Delta\theta$1ch).

The baseband signal obtained by despread processing using Code A (hereinafter simply referred to as "baseband signal of Code A") rotates against a transmit signal by a phase variation ($\Delta\theta$1fad) due to fading. The baseband signal obtained by despread processing using Code B (hereinafter simply referred to as "baseband signal of Code B") rotates against the baseband signal of Code A by (66 $\theta$AB).

FIG. 5C is a schematic view showing a state of a phase rotation amount of the baseband signal obtained by despread processing using Code A of path 2. FIG. 5D is a schematic view showing a state of a phase rotation amount of the baseband signal obtained by despread processing using Code B of path 2.

Because of a difference between path 1 and path 2 in the propagation path, the baseband signal of Code A rotates against the baseband signal of Code A of path 1 by a phase rotation amount ($\Delta\theta$p) and a phase variation ($\Delta\theta$2fad) due to fading. In addition, the phase rotation amount ($\Delta\theta$p) is a phase rotation amount corresponding to a time difference (tp) between path 1 and path 2. The baseband signal of Code B further rotates against the baseband signal of Code A of path 1 by $\Delta\theta$AB.

Next, attention will be paid on the baseband signal subjected to RAKE combining by the RAKE combining section 29. FIG. 5E is a schematic view showing a state of a phase rotation amount of the baseband signal of Code A subjected to RAKE combining. FIG. 5F is a schematic view showing a state of a phase rotation amount of the baseband signal of Code B subjected to RAKE combining.

As illustrated in FIG. 5E, the baseband signal subjected to RAKE combining of Code A (namely, the baseband signal, which is obtained by RAKE combining the baseband signal of Code A of path 1 and the baseband signal of Code A of path 2) becomes a signal including a channel estimation error ($\Delta\theta$ch. errA).

Likewise, as illustrated in FIG. 5F, the baseband signal subjected to RAKE combining of Code B (namely, the baseband signal, which is obtained by RAKE combining the baseband signal of Code B of path 1 and the baseband signal of Code B of path 2) becomes a signal including a channel estimation error ($\Delta\theta$ch. errB) and a phase rotation amount ($\Delta\theta$AB) due to a frequency offset to be calculated.

FIG. 6A is a schematic view showing a state of the channel estimation error of the baseband signal of Code A subjected to RAKE combining. FIG. 6B is a schematic view showing a state of the channel estimation error of the baseband signal of Code B subjected to RAKE combining. FIG. 6C is a schematic view showing a state of a signal to be subjected to complex correlation processing at the conventional radio receiving apparatus that performs frequency offset compensation.

In other words, as illustrated in FIGS. 6A, 6B, and 6C, since complex correlation processing is performed using the baseband signals of Code A and Code B each which includes the channel estimation error and which is subjected to RAKE combining, the signal obtained by this complex correlation processing includes the channel estimation error. Accordingly, the finally obtained phase rotation amount due to the frequency offset includes a channel estimation error, that is, an error corresponding to (Δθch. errA+Δ θ ch. errB). As a result, at the high-speed moving time at which channel estimation accuracy deteriorates, the estimation error of the phase rotation amount due to particularly the frequency offset deteriorates, resulting in a decline in the quality of a demodulated signal.

DISCLOSURE OF INVENTION

The present invention has been made with consideration given to the aforementioned problem, and it is an object of the present invention is to provide a radio receiving apparatus that correctly estimates a phase rotation amount due to a frequency offset even at a high-speed moving time.

The above object is attained by providing complex correlation processing to a received signal (baseband signal), which is not yet multiplied by an inverse characteristic of a channel estimation value estimated by use of the received signal, to estimate the phase rotation amount in the received signal.

BRIEF DESCRIPTION OF DRAWINGS

FIG. 5A is a schematic view showing a state of a phase rotation amount of a baseband signal obtained by despread processing using Code A of path 1;

FIG. 5B is a schematic view showing a state of a phase rotation amount of a baseband signal obtained by despread processing using Code B of path 1;

FIG. 5C is a schematic view showing a state of a phase rotation amount of a baseband signal obtained by despread processing using Code A of path 2;

FIG. 5D is a schematic view showing a state of a phase rotation amount of a baseband signal obtained by despread processing using Code B of path 2;

FIG. 5E is a schematic view showing a state of a phase rotation amount of a baseband signal of Code A subjected to RAKE combining;

FIG. 5F is a schematic view showing a state of a phase rotation amount of a baseband signal of Code B subjected to RAKE combining;

FIG. 6A is a schematic view showing a state of a channel estimation error of a baseband signal of Code A subjected to RAKE combining;

FIG. 6B is a schematic view showing a state of a channel estimation error of a baseband signal of Code B subjected to RAKE combining;

FIG. 6C is a schematic view showing a state of a signal to be subjected to complex correlation processing at the conventional radio receiving apparatus that performs frequency offset compensation;

BEST MODE FOR CARRYING OUT THE INVENTION

The following will explain the embodiments of the present invention with reference to the drawings accompanying herewith.

(Embodiment 1)

Figure 7:
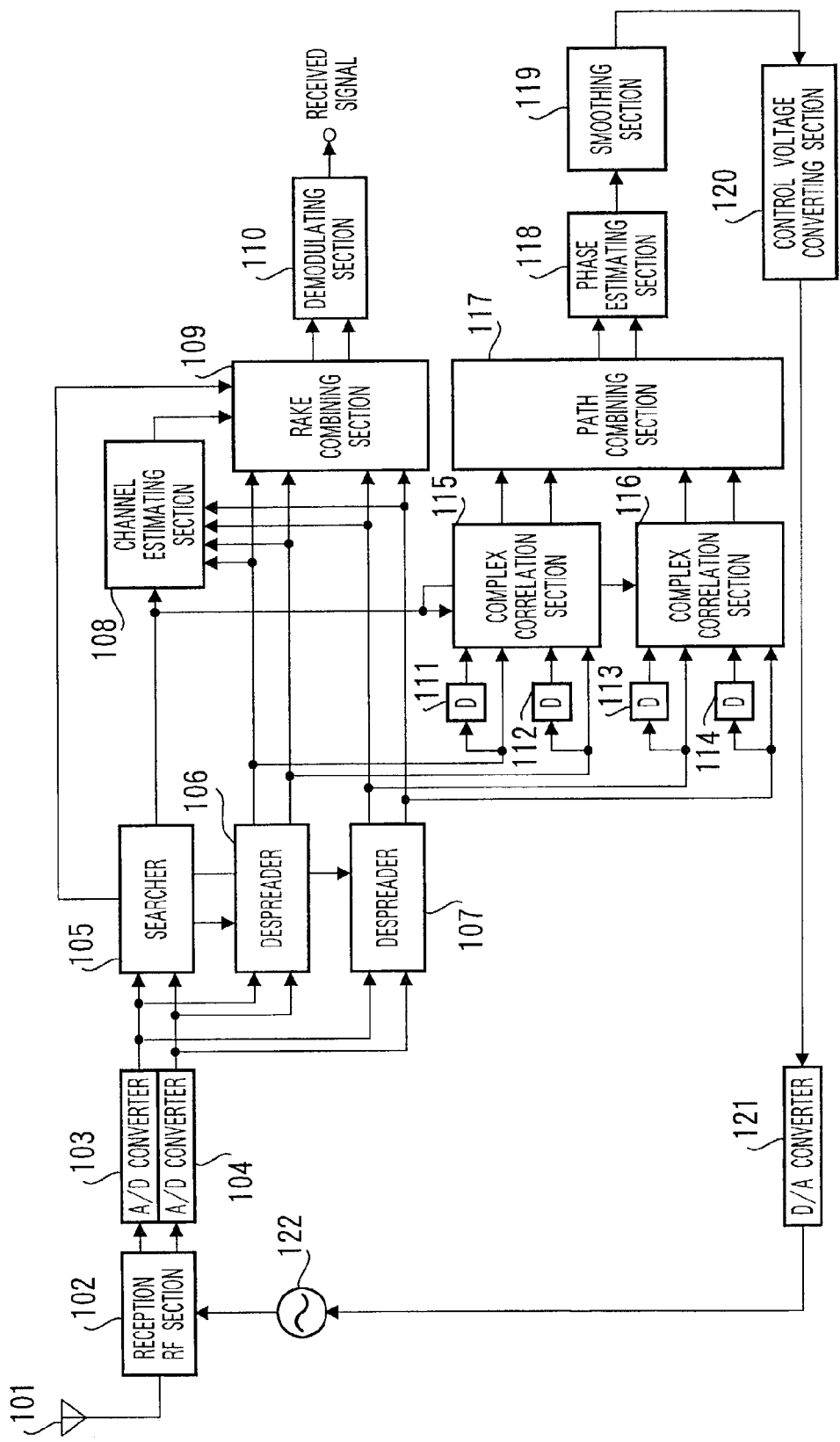
FIG. 7 is a block diagram showing a configuration of a radio receiving apparatus according to Embodiment 1 of the present invention.

FIG. 7 is a block diagram showing a configuration of a radio receiving apparatus according to Embodiment 1 of the present invention. In addition, FIG. 7 is one example showing a configuration when two received signals are handled and two known symbols are received with Code A and Code B in one slot by a communication partner.

In FIG. 7, a reception RF section 102 converts signals (received signals) received from an antenna 101 into baseband signals using a local signal sent from a crystal oscillator 122 to be described later, and outputs baseband signals with I-ch and Q-ch to an A/D converter 103 and an A/D converter 104, respectively.

The A/D converter 103 converts the baseband signal with I-ch into a digital signal and outputs it to a searcher 105 and despreaders 106 and 107. Moreover, the A/D converter 104 converts the baseband signal with Q-ch into a digital signal and outputs it to the searcher 105 and the despreaders 106, and 107.

The searcher 105 detects despreading timing at the despreaders 106 and 107, pilot timing at a channel estimating section 108, and a path timing at a RAKE combining section 109 by use of the baseband signals with I-ch and Q-ch. This searcher 105 outputs the detected despread timing to the despreaders 106 and 107, outputs the detected pilot timing to the channel estimating section 108, and outputs the detected path timing to the RAKE combing section 109.

The despreaders 106 and 107 provide despread processing to the baseband signals with I-ch and Q-ch based on despread timing from the searcher 105, and outputs the despread baseband signal with I-ch to a complex correlation section 115 and a delay section 111, and outputs the despread baseband signal with Q-ch to the RAKE combining section 109, complex correlation section 115 and a delay section 112.

The channel estimating section 108 calculates a channel estimation value using the despread baseband signals from the despreaders 106 and 107 based on pilot timing from the searcher 105, and outputs the calculated channel estimation value to the RAKE combining section 109.

The RAKE combining section 109 multiplies the despread baseband signals from the despreaders 106 and 107 by an inverse characteristic of the channel estimation value from the channel estimating section 108 based on path timing from the searcher 105, and RAKE combines the baseband signals multiplied by the inverse characteristic. A demodulating section 110 provides demodulation processing to the baseband signals subjected to RAKE combining.

The delay section 111 delays the baseband signal with I-ch despread by the despreader 106, and outputs the resultant to the complex correlation section 115. Similarly, the delay section 113 delays the baseband signal with I-ch despread by the despreader 107, and outputs the resultant to a complex correlation section 116. Moreover, the delay section 112 delays the baseband signal with Q-ch despread by the despreader 106, and outputs the resultant to the complex correlation section 115. Likewise, the delay section 114 delays the baseband signal with Q-ch despread by the despreader 107, and outputs the resultant to the complex correlation section 116.

The complex correlation section 115 performs complex correlation processing using the baseband signal with I-ch despread by the despreader 106 and the baseband signal with I-ch delayed by the delay section 111. Also, the complex correlation section 115 performs complex correlation processing using the baseband signal with Q-ch despread by the despreader 106 and the baseband signal with Q-ch delayed by the delay section 112.

The complex correlation section 116 performs complex correlation processing using the baseband signal with I-ch despread by the despreader 107 and the baseband signal with I-ch delayed by the delay section 113. Also, the complex correlation section 116 performs complex correlation processing using the baseband signal with Q-ch despread by the despreader 107 and the baseband signal with Q-ch delayed by the delay section 114.

A path combining section 117 combines the signals subjected to complex correlation processing by the complex correlation sections 115 and 116, and outputs a combined signal to a phase estimating section 118. The phase estimating section 118 calculates a phase rotation amount per unit time using the signals combined by the path combining section 117. A smoothing section 119 calculates a frequency offset using the calculated phase rotation amount per unit time. A control voltage converting section 120 converts the calculated frequency offset into a control voltage against a crystal oscillator 122. A D/A converter 121 converts the converted control voltage into an analog signal and outputs it to the crystal oscillator 122. The crystal oscillator 122 is controlled by the control voltage from the D/A converter 121 to output a local signal to the reception RF section 102.

Figure 1:
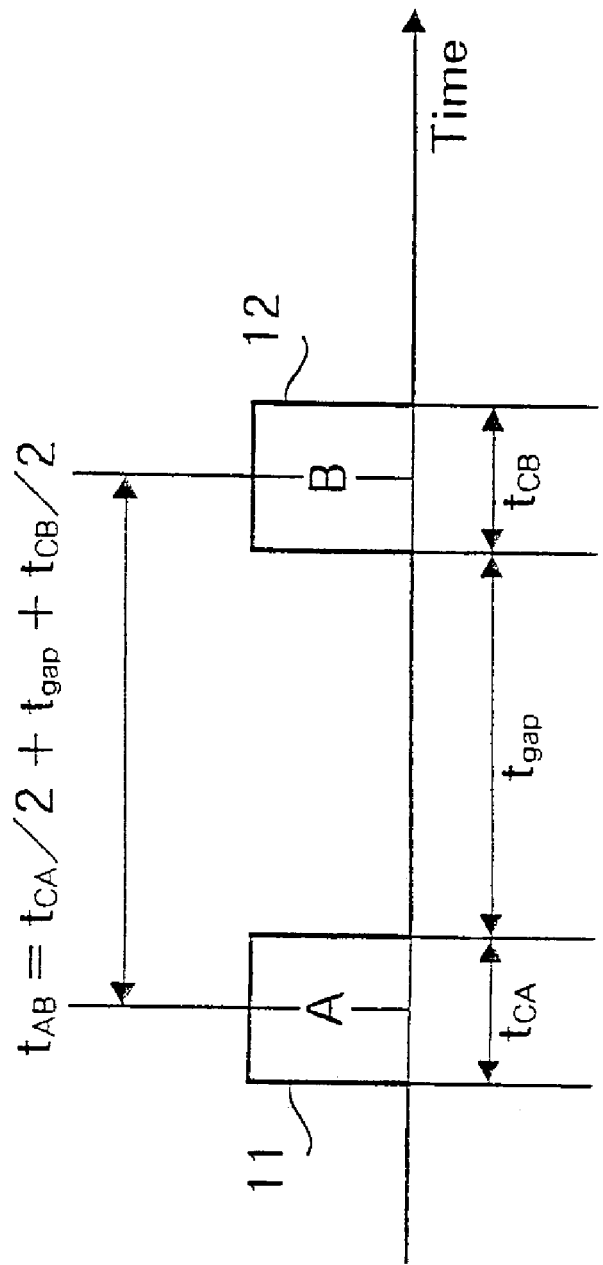
FIG. 1 is a schematic view showing a state of a known symbol transmitted to a radio receiving apparatus that performs frequency offset compensation.
Figure 2:
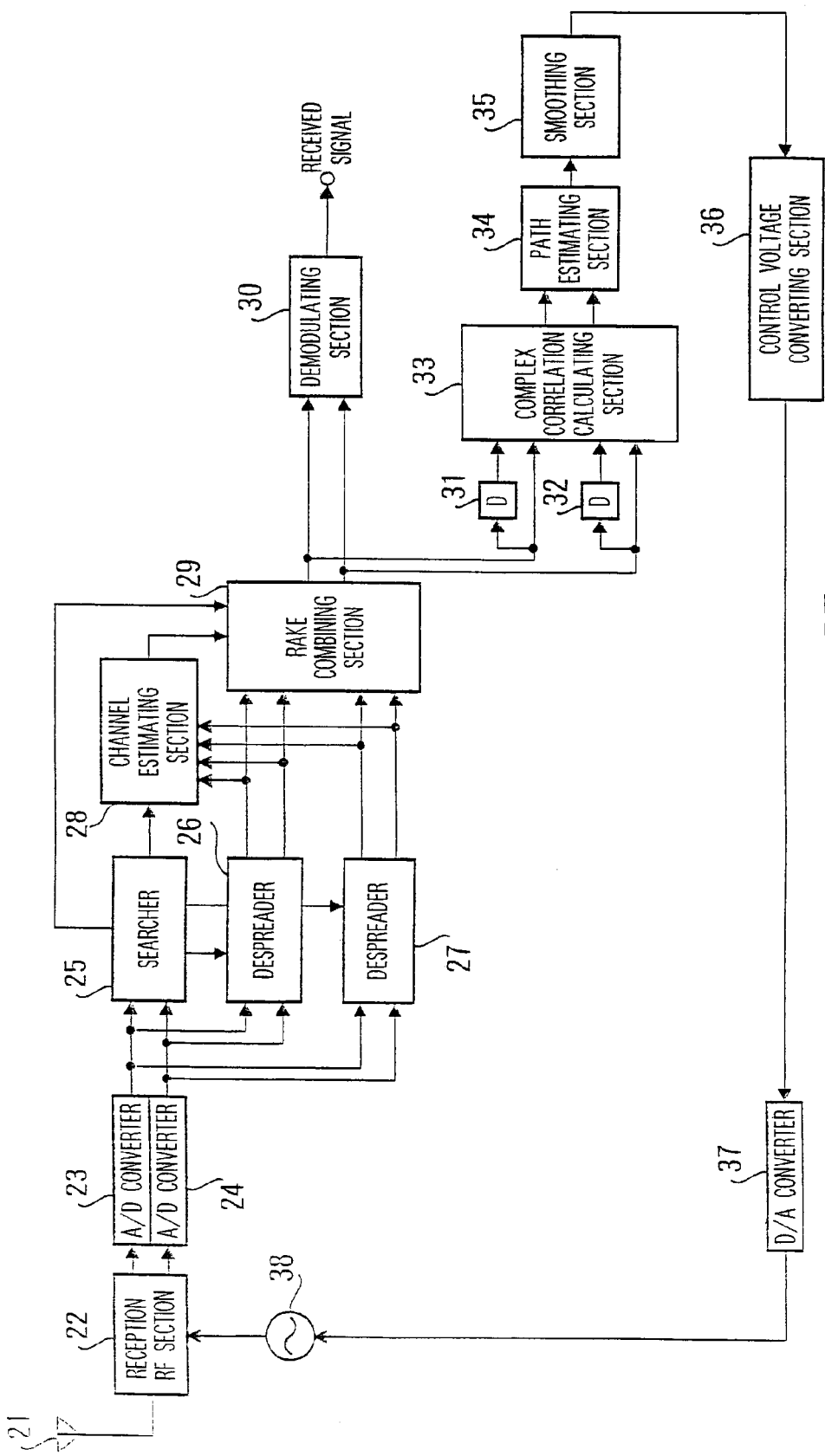
FIG. 2 is a block diagram showing a configuration of a conventional radio receiving apparatus that performs frequency offset compensation.
Figure 3:
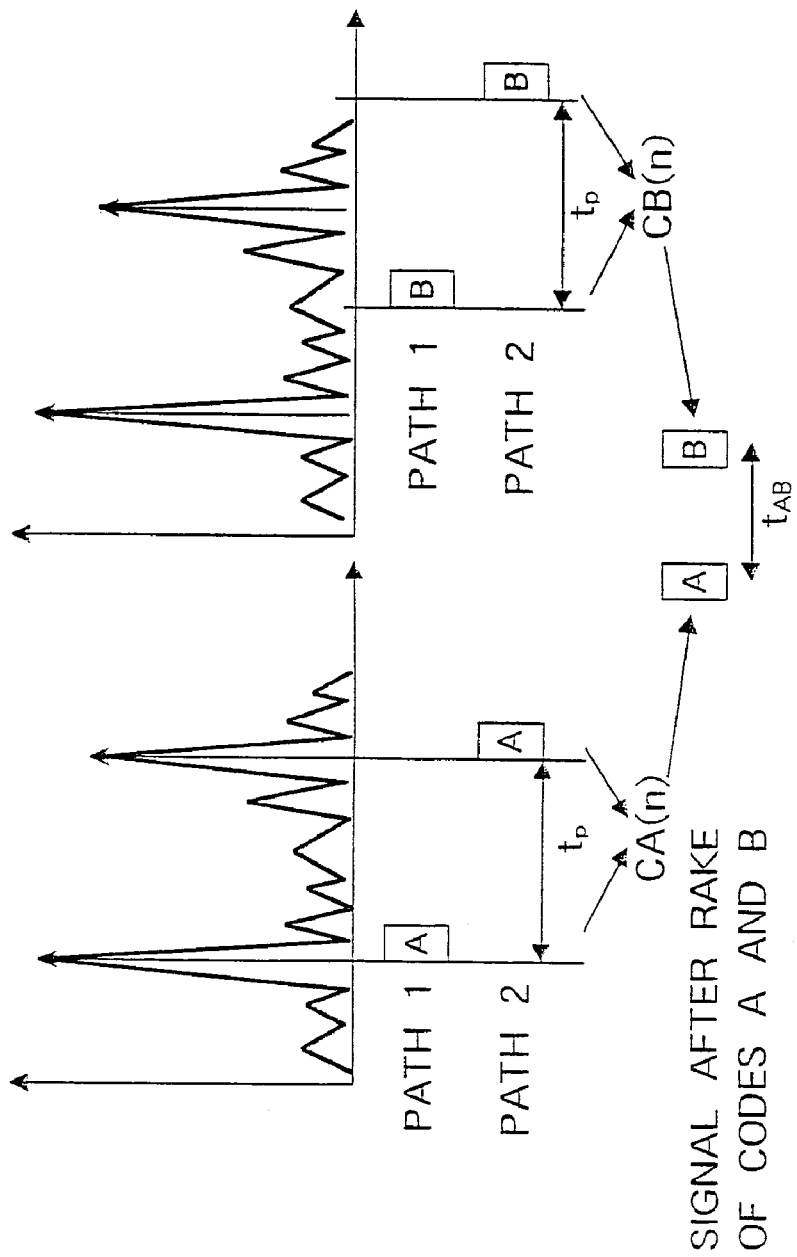
FIG. 3 is a schematic view showing a timing state of a known symbol in a path received by a conventional radio receiving apparatus that performs frequency offset compensation.
Figure 4:
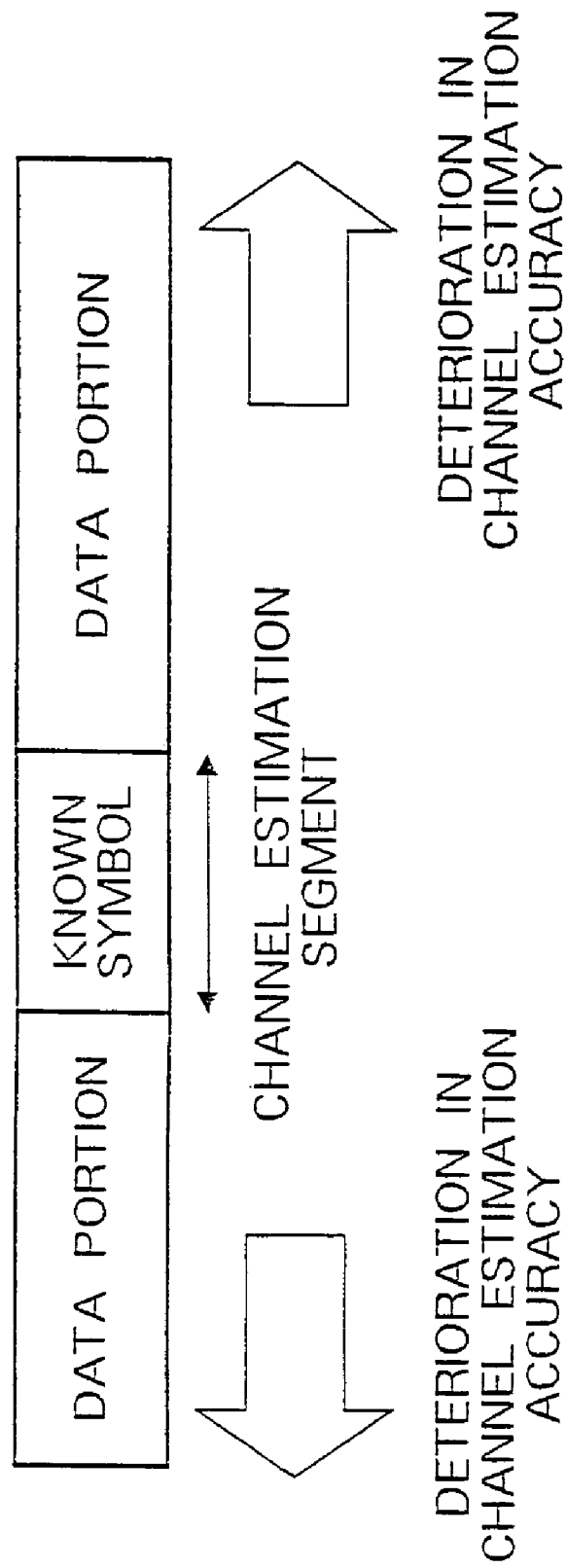
FIG. 4 is a schematic view showing a state of channel estimation accuracy due to a conventional radio receiving apparatus that performs frequency offset compensation.
Figure 8:
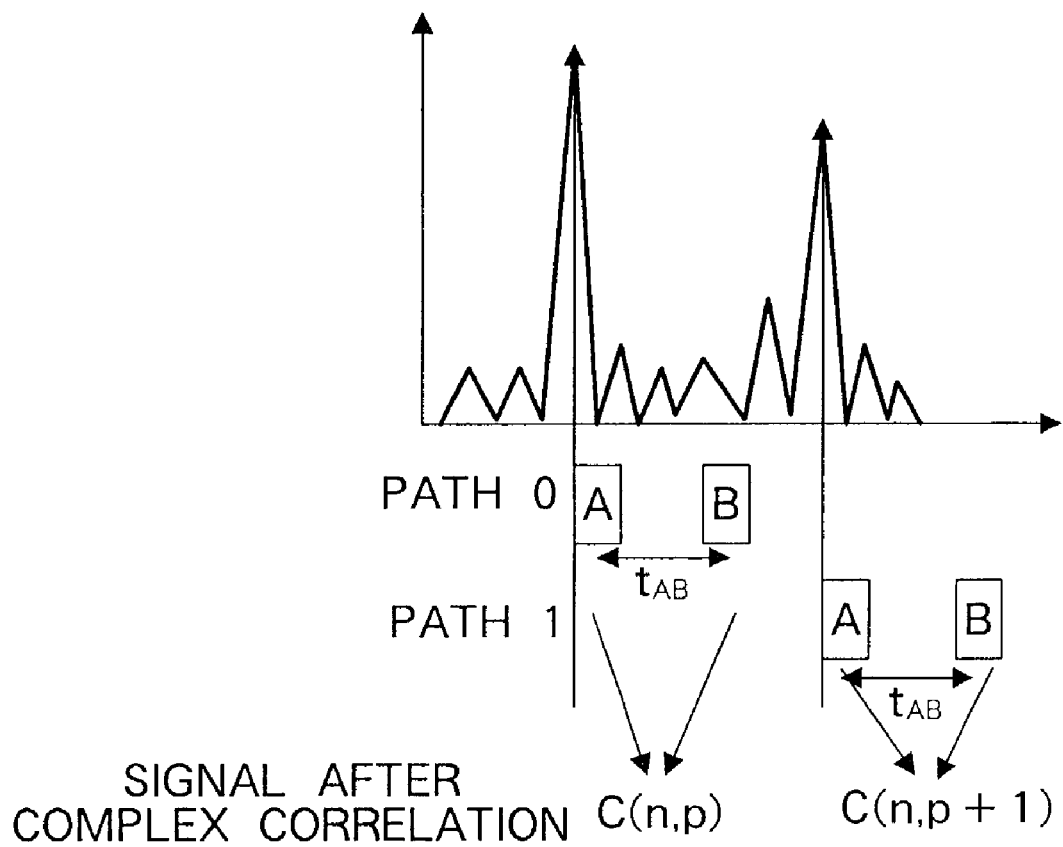
FIG. 8 is a schematic view showing a state of a known symbol in a path to be received by the radio receiving apparatus according to Embodiment 1 of the present invention.

An explanation will be next give of the operations of the radio receiving apparatus having the aforementioned configuration with reference to FIG. 8. FIG. 8 is a schematic view showing a state of a known symbol in a path to be received by the radio receiving apparatus according to Embodiment 1 of the present invention. The communication partner of the present radio receiving apparatus transmits a signal including known symbols 11 and 12, which are despread by Code A and Code B, respectively, as illustrated in FIG. 1.

The signal transmitted from the communication partner is received via the antenna 101 by the radio receiving apparatus shown in FIG. 7. In FIG. 7, a signal received (received signal) by the antenna 101 is converted into baseband signals from a carrier frequency signal by the reception RF section 102. At this time, a local signal from the crystal oscillator 122 is used at the reception RF section 102. A baseband signal with I-ch is output to the A/D converter 103 from the reception RF section 102. Also, a baseband signal with Q-ch is output to the A/D converter 104 from the reception RF section 102. The baseband signal with I-ch is converted into a digital signal by the A/D converter 103, and the digital signal is output to the searcher 105 and the despreaders 106 and 107. Similarly, the baseband signal with Q-ch is converted into a digital signal by the A/D converter 104, and the digital signal is output to the searcher 105 and the despreaders 106 and 107.

The searcher 105 examines the correlation between the baseband signal and Code A, which is the known code, and detects code timing with which power of a correlation value reaches a maximum value. Also, the searcher 105 detects timing of Code B using the detected code timing. In this way, the searcher 105 calculates despread timing at the despreaders 106 and 107, pilot timing at the channel estimating section 108, and path timing at the RAKE combining section 109.

Timing of Code A and Code B of path 1 is output to the despreader 106 and complex correlating section 115 from the searcher 105. Timing of Code A and Code B of path 2 is output to the despreader 107 and complex correlating section 116 from the searcher 105. Moreover, timing of Code A and Code B of path 1 and timing of Code A and Code B of path 2 are output to the channel estimating section 108 from the searcher 105. Still moreover, timing of paths 1 and 2 are output to the RAKE combining section 109 from the searcher 105.

The despreader 106 provides despread processing using Code A and Code B to the baseband signal with I-ch based on timing of Code A and that of Code B of path 1 from the searcher 105, respectively. Similarly, the despreader 106 provides despread processing using Code A and Code B to the baseband signal with Q-ch based on timing of Code A and that of Code B of path 1 from the searcher 105, respectively. Moreover, the despreader 106 provides despread processing using a predetermined spreading code (spreading code assigned to the present radio receiving apparatus) to the baseband signals with I-ch and Q-ch.

The despreader 107 provides despread processing using Code A and Code B to the baseband signal with I-ch based on timing of Code A and that of Code B of path 2 from the searcher 105, respectively. Similarly, the despreader 107 provides despread processing using Code A and Code B to the baseband signal with Q-ch based on timing of Code A and that of Code B of path 2 from the searcher 105, respectively. Moreover, the despreader 107 provides despread processing using a predetermined spreading code to the baseband signals with I-ch and Q-ch, respectively.

The baseband signals subjected to despread processing by the despreaders 106 and 107 are output to the channel estimating section 108 and RAKE combining section 109.

At the channel estimating section 108, signals corresponding to the known symbols 11 and 12 are extracted from among the baseband signals with I-ch and Q-ch from the despreader 106 based on timing of Code A and that of Code B of path 1 from the searcher 105. The channel estimation value of path 1 is calculated using these extracted signals. Similarly, signals corresponding to the known symbols 11 and 12 are extracted from among the baseband signals with I-ch and Q-ch from the despreader 107 based on timing of Code A and that of Code B of path 2 from the searcher 105. The channel estimation value of path 2 is calculated using these extracted signals. The channel estimation values of path 1 and path 2 calculated by the channel estimating section 108 are output to the RAKE combining section 109.

At the RAKE combining section 109, the despread baseband signals with I-ch and Q-ch from the despreader 106 are multiplied by an inverse characteristic of the channel estimation value of path 1 from the channel estimating section 108. The despread baseband signals with I-ch and Q-ch from the despreader 107 are multiplied by an inverse characteristic of the channel estimation value of path 2 from the channel estimating section 108. Moreover, the despread baseband signals with I-ch and Q-ch of path 1 multiplied by the inverse characteristic of the channel estimation value is RACKE combined with the despread baseband signals with I-ch and Q-ch of path 2 multiplied by the inverse characteristic of the channel estimation value based on timing of path 1 and timing of path 2 from the searcher 105.

The RAKE combined baseband signals with I-ch and Q-ch are output to the demodulating section 110. At the demodulating section 110, demodulation processing is provided to the RAKE combined baseband signals with I-ch and Q-ch, thereby obtaining received data.

On the other hand, the baseband signal with I-ch (Q-ch) subjected to despread processing by the despreader 106 is output to the complex correlating section 115. Also, after the baseband signal with I-ch (Q-ch) subjected to despread processing by the despreader 106 is delayed by tAB by the delay section 111 (delay section 112), the resultant is output to the complex correlating section 115. Here, tAB is tAB of FIG. 1 and the expression of tAB=tCA/2+tgap+tCB/2 is given.

The baseband signal with I-ch (Q-ch) subjected to despread processing by the despreader 107 is output to the complex correlating section 116. Also, after the baseband signal with I-ch (Q-ch) subjected to despread processing by the despreader 107 is delayed by tAB by the delay section 113 (delay section 114), the resultant is output to the complex correlating section 116.

The complex correlating section 115 performs complex correlation processing using the baseband signal with I-ch (Q-ch) subjected to despread processing by the despreader 106 and the baseband signal with I-ch (Q-ch), which is delayed by tAB by the delay section 111 (delay section 112) and which is subjected to despread processing, based on timing of Code A and that of Code B of path 1 from the searcher 105. The signals with I-ch and Q-ch of path 1 subjected to complex correlation processing are output to the path combining section 117.

The complex correlating section 116 performs complex correlation processing using the baseband signal with I-ch (Q-ch) subjected to despread processing by the despreader 106 and the baseband signal with I-ch (Q-ch), which is delayed by tAB by the delay section 111 (delay section 112) and which is subjected to despread processing, based on timing of Code A and that of Code B of path 2 from the searcher 105. The signals with I-ch and Q-ch subjected to complex correlation processing of path 2 are output to the path combining section 117.

At the path combining section 117, the signal subjected to complex correlation processing by the complex correlation section 115 is path combined with the signal subjected to complex correlation processing by the complex correlation section 116 for each I-ch and Q-ch. The path combined signals with I-ch and Q-ch, which are expressed by the following equation, are output to the phase estimating section 118.

$$\begin{cases} C_{est}(n) \cdot i = \frac{1}{P}\sum_{P=0}^{P-1} C(n, p) \cdot i \\ C_{est}(n) \cdot q = \frac{1}{P}\sum_{P=0}^{P-1} C(n, p) \cdot q \end{cases} \quad \text{[Equation 1]}$$

wherein Cest(n).i is a path-combined signal with I-ch at nth slot, and Cest(n).q is a path-combined signal with Q-ch in nth slot. Also, C(n,p).i is a signal with I-ch subjected to complex correlation processing in nth slot and C(n,p).q is a signal with Q-ch subjected to complex correlation processing in nth slot.

At the phase estimating section 118, a phase rotation amount is calculated using the signals combined by the path combining section 117. Namely, the phase rotation amount θest(n) in nth slot is expressed by the equation given below:

$$\theta_{est}(n) = \frac{1}{t_{AB}} \cdot \tan^{-1}\left(\frac{C_{est}(n) \cdot q}{C_{est}(n) \cdot i}\right) \quad \text{[Equation 2]}$$

The smoothing section 119 provides smooth processing to the phase rotation amount θest(n) estimated on a slot-by-slot basis by the phase estimating section 118 based on the equation given below:

$$\phi_{est}(n) = \phi_{est}(n-1) + \alpha\phi_{est}(n)[\text{radian}] \quad \text{[Equation 3]}$$

wherein α is a forgetting coefficient. In addition, though this embodiment uses a weighting average as smooth processing, a moving average or simple average, etc. may be used. This smooth processing can suppress an error in the phase estimation accuracy due to noise.

Moreover, the smoothing section 119 calculates a frequency offset to be corrected by use of the phase rotation amount subjected to smooth processing. The frequency offset to be corrected is output to the control voltage converting section 120.

The control voltage converting section 120 converts the frequency offset to be corrected into a control voltage at the crystal oscillator 122. After this control voltage is converted into an analog signal by the D/A converter 121, the resultant is output to the crystal oscillator 122. The frequency offset at the crystal oscillator 122 is corrected by the control voltage converted into the analog signal. By the operation of the aforementioned closed loop, the carrier frequency offset is corrected at the communication partner and the present radio receiving apparatus. This makes it possible to suppress the phase rotation that degrades the quality of the received signal.

Figure 10:
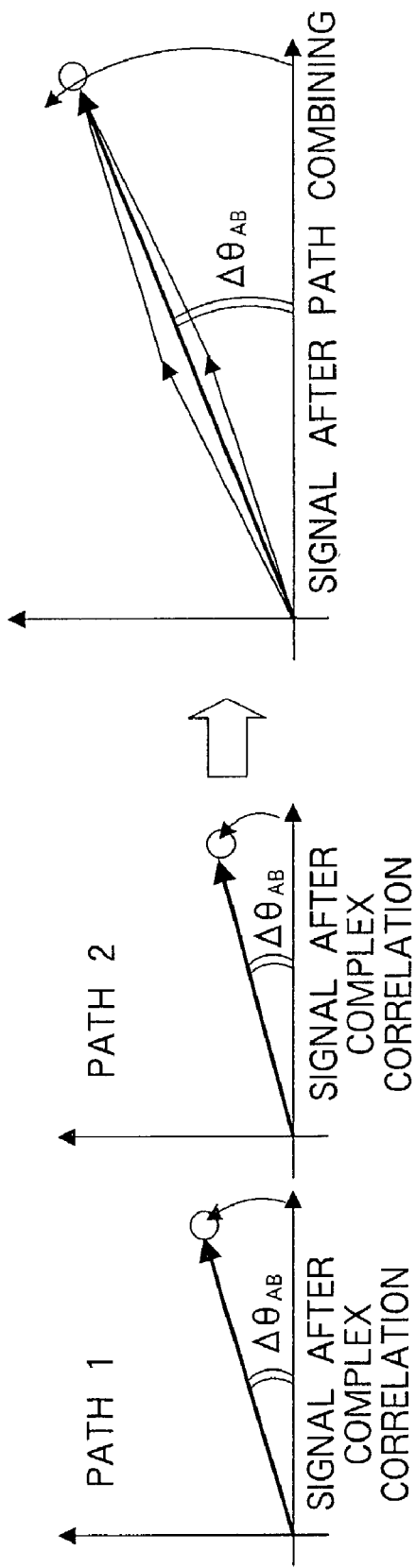
FIG. 10 is a schematic view showing a state of a signal subjected to path combining in connection with the signal subjected to complex correlation processing.

An explanation will be next given of the factors that make it possible for the radio receiving apparatus of this embodiment to estimate a correct phase rotation amount. FIG. 10 is a schematic view showing a state of signals subjected to path combining by use of the radio receiving apparatus according to Embodiment 1 of the present invention.

Figure 9A:
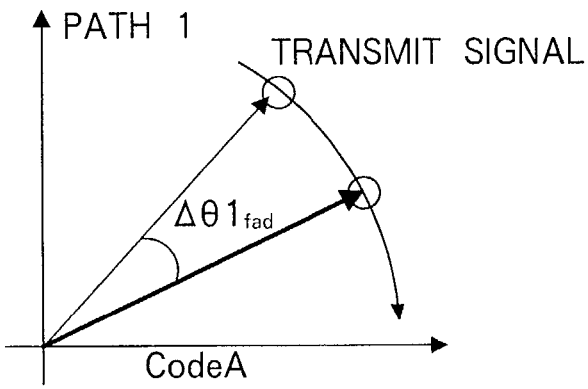
FIG. 9A is a schematic view showing a state of a phase rotation amount of a baseband signal obtained by despread processing using Code A of path 1.
Figure 9B:
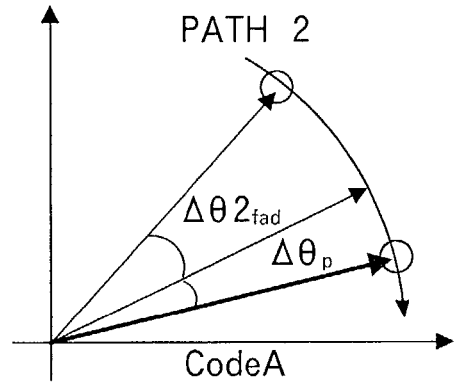
FIG. 9B is a schematic view showing a state of a phase rotation amount of a baseband signal obtained by despread processing using Code A of path 2.

First, in FIG. 9, attention is paid to the baseband signal (hereinafter referred to simply "baseband signal of Code A") obtained by despread processing using Code A. FIG. 9A is a schematic view showing a state of a phase rotation amount of a baseband signal obtained by despread processing using Code A of path 1. FIG. 9B is a schematic view showing a state of a phase rotation amount of a baseband signal obtained by despread processing using Code A of path 2.

As illustrated in FIGS. 9A and 9B, the baseband signal of Code A of path 1 rotates against a transmit signal by a phase variation ($\Delta\theta1$fad) due to fading. While, because of a difference between path 1 and path 2 in the propagation path, the baseband signal of Code A rotates against the baseband signal of Code A of path 1 by a phase rotation amount ($\Delta\theta p$) and a phase variation ($\Delta\theta2$fad) due to fading. In addition, the phase rotation amount ($\Delta\theta p$) is a phase rotation amount corresponding to a time difference (tp) between path 1 and path 2.

Figure 9C:
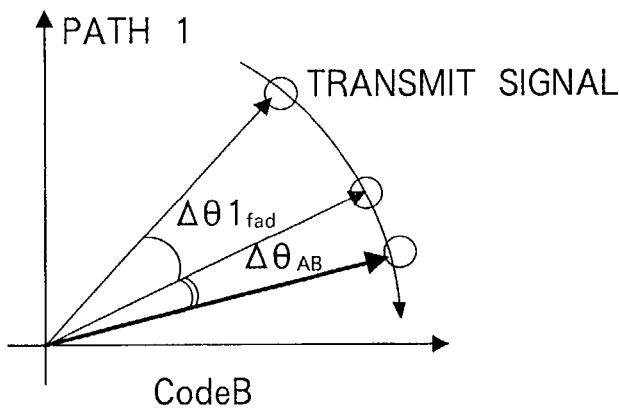
FIG. 9C is a schematic view showing a state of a phase rotation amount of a baseband signal obtained by despread processing using Code B of path 1.
Figure 9D:
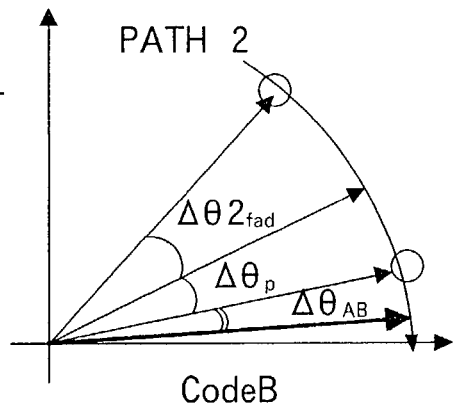
FIG. 9D is a schematic view showing a state of a phase rotation amount of a baseband signal obtained by despread processing using Code B of path 2.

Next, attention is paid to the baseband signal (hereinafter referred to simply "baseband signal of Code B") obtained by despread processing using Code B. FIG. 9C is a schematic view showing a state of a phase rotation amount of a baseband signal obtained by despread processing using Code B of path 1. FIG. 9D is a schematic view showing a state of a phase rotation amount of a baseband signal obtained by despread processing using Code B of path 2.

As illustrated in FIGS. 9C and 9D, the baseband signal of Code B at path 1 further rotates against a transmit signal of Code A of path 1 by a phase variation ($\Delta\theta AB$). The baseband signal of Code B of path 2 further rotates against a transmit signal of Code A of path 2 by a phase variation ($\Delta\theta AB$).

Figure 9E:
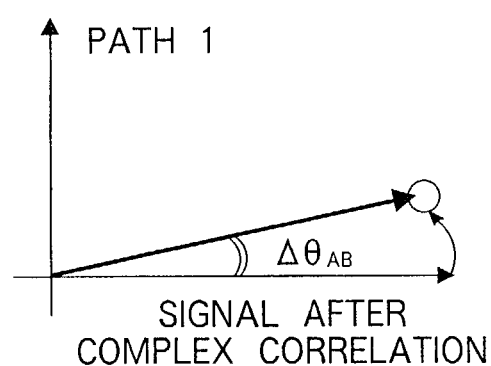
FIG. 9E is a schematic view showing a state of a signal subjected to complex correlation processing of path 1.
Figure 9F:
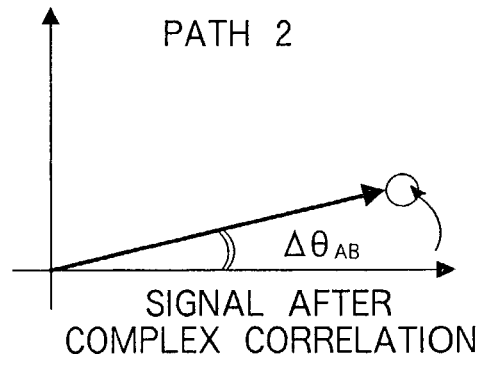
FIG. 9F is a schematic view showing a state of a signal subjected to complex correlation processing of path 2.

The complex correlating section 115 performs complex correlation processing using the baseband signal of Code A and that of code B of path 1. FIG. 9E is a schematic view showing a state of a signal subjected to complex correlation processing of path 1. FIG. 9F is a schematic view showing a state of a signal subjected to complex correlation processing of path 2.

The complex correlating section 116 performs complex correlation processing using the baseband signal of Code A and that of code B at path 1 to obtain a signal subjected to complex correlation processing of path 1 as shown in FIG. 9E. Likewise, the complex correlating section 116 performs complex correlation processing using the baseband signal of Code A and that of code B of path 2 to obtain a signal subjected to complex correlation processing of path 2 as shown in FIG. 9E.

In other words, since complex correlation processing is performed using the baseband signals, which are not yet subjected to RAKE combining, channel estimation errors ($\Delta\theta$ch. errA and $\Delta\theta$ch. errB shown in FIGS. 5E, 5F, 6A, and 6B), which exist in the conventional system, are not included in the signals subjected to complex correlation processing of paths 1 and 2, as is obvious from FIGS. 9E to 9F. In addition, there is a possibility that an error due to noise of the phase rotation amount will be included in the signals subjected to complex correlation processing of paths 1 and 2.

After that, the aforementioned signals subjected to complex correlation processing of paths 1 and 2 are combined for each I-ch and Q-ch by the path combining section 117. FIG. 10 is a schematic view showing a state of signals subjected to path combining in connection with the signals subjected to complex correlation processing. By path diversity effect, errors caused by noise of the phase rotation amount are reduced from the signals subjected to path combining. As explained above, the phase estimating section 118 estimates the phase rotation amount using the signals subjected to path combining. As illustrated in FIG. 10, since no channel estimation error is included in the signals subjected to path combining, the accuracy of phase rotation amount estimated by the phase estimating section 118 becomes high.

In addition, FIGS. 9A, 9B, 9C, 9D, 9E, 9F and FIG. 10 shows the case in which the received signal exists in a first quadrant in order to simplify the explanation. However, the present invention can be applied to the case in which the received signal exists in any quadrant.

In this way according to this embodiment, the phase rotation amount is not estimated using a signal obtained by combining the despread baseband signals of the respective paths (namely, a signal obtained by multiplying the despread baseband signal of each path by an inverse characteristic of channel estimation value). Instead, complex correlation processing is performed for each path using the despread baseband signal, which is not yet subjected to RAKE combining (namely, a baseband signal, which is a despread signal and which is not multiplied by the inverse characteristic of channel estimation value). Then, the phase rotation amount is estimated using the signal obtained by combing the signals subjected to complex correlation processing at the respective paths. If the phase rotation amount is thus estimated, no channel estimation error caused by RAKE combing is included in the signals subjected to complex correlation processing of the respective paths and the signals subjected to path combining, so that the phase rotation amount with good accuracy can be obtained.

Therefore, according to this embodiment, the phase rotation amount with good accuracy can be estimated regardless of the channel estimation accuracy even at a high speed moving time, and this makes it possible to compensate for a frequency offset stably.

(Embodiment 2)

Figure 11:
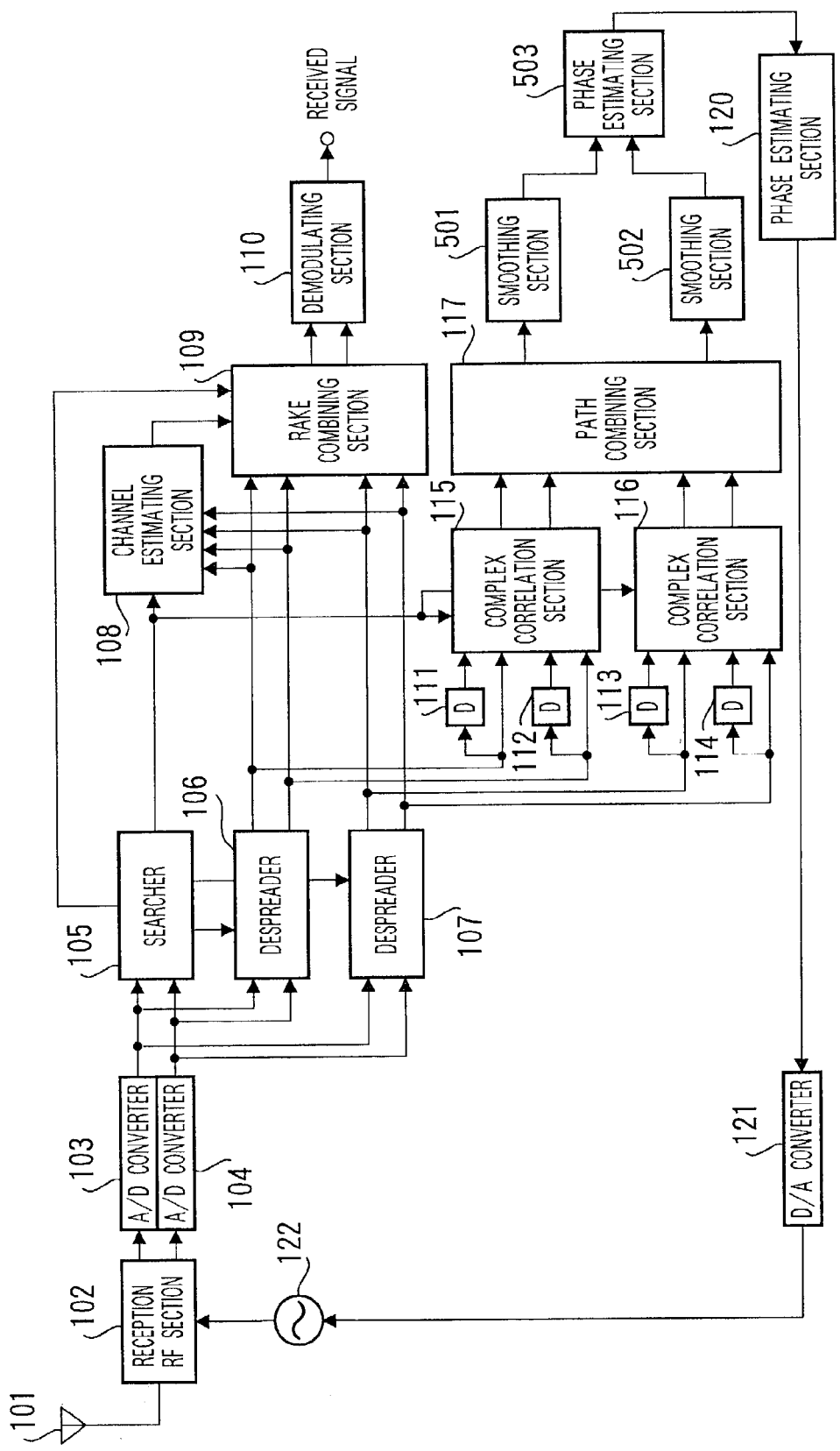
FIG. 11 is a block diagram showing a configuration of a radio receiving apparatus according to Embodiment 2 of the present invention.

This embodiment explains a case in which the signals subjected to path combining are smoothed for each I-ch and Q-ch and the phase rotation amount is estimated using the respective smoothed signals. FIG. 11 is a block diagram showing a configuration of a radio receiving apparatus according to Embodiment 2 of the present invention. In addition, some sections in the second embodiment illustrated in FIG. 11 are assigned the same symbols as those of corresponding sections in the first embodiment (FIG. 7) and its explanation is omitted.

The radio receiving apparatus of this embodiment is different from that of the first embodiment in the operation after the path combining section 117. More specifically, the radio receiving apparatus of this embodiment has a configuration including smoothing sections 501, 502, and a phase estimating section 503 in place of the phase estimating section 118 and smoothing section 119 of the radio receiving apparatus according to Embodiment 1.

The smoothing section 501 provides averaging processing to the signal with I-ch subjected to path combing by the path combining section 117. The smoothing section 502 provides averaging processing to the signal with Q-ch subjected to path combing by the path combining section 117. Here, it is assumed that a moving average in the slot is used as averaging processing.

A signal (Cave (n).i) of nth slot subjected to the moving average by the smoothing section 501 and a signal (Cave (n).q) of nth slot subjected to the moving average by the smoothing section 502 can be expressed by the equation given below. In this case, k is a moving average length.

$$\begin{cases} C_{ave}(n) \cdot i = \frac{1}{N} \sum_{k=0}^{N-1} C_{add}(n-k) \cdot j \\ C_{ave}(n) \cdot q = \frac{1}{N} \sum_{k=0}^{N-1} C_{add}(n-k) \cdot q \end{cases}$$ [Equation 4]

The phase estimating section 503 calculates the phase rotation amount using the respective signals subjected to the moving average by the smoothing sections 501 and 502. Namely, the phase rotation amount in the nth slot calculated by the phase estimating section 503 is expressed by the equation given below:

$$\hat{\theta}_{est}(n) = \frac{1}{t_{AB}} \cdot \tan^{-1}\left(\frac{C_{add}(n) \cdot q}{C_{add}(n) \cdot i}\right)$$ [Equation 5]

The phase rotation amount calculated by the phase estimating section 503 is output to the control voltage converting section 120, and then the same operation as that of Embodiment 1 is performed.

Thus, in this embodiment, the signal subjected to the path combining is smoothed for each I-ch and Q-ch, and the phase rotation amount is calculated using the respective smoothed signals. This makes it possible to suppress the deterioration in the phase estimation accuracy due to noise greatly as compared with Embodiment 1 in which the calculated phase rotation amount is smoothed.

Moreover, at a transitional time, the moving average N at the smoothing sections 501 and 502 is set to be small to make it possible to follow the change in the frequency at high-speed to estimate the frequency offset. Also, at a steady time, the aforementioned N is set to be large to make it possible to adapt to the propagation path and to estimate the frequency offset. Additionally, though this embodiment has explained the case in which the moving average is used as smoothing processing, a weighting average or simple average may be used.

(Embodiment 3)

Figure 12:
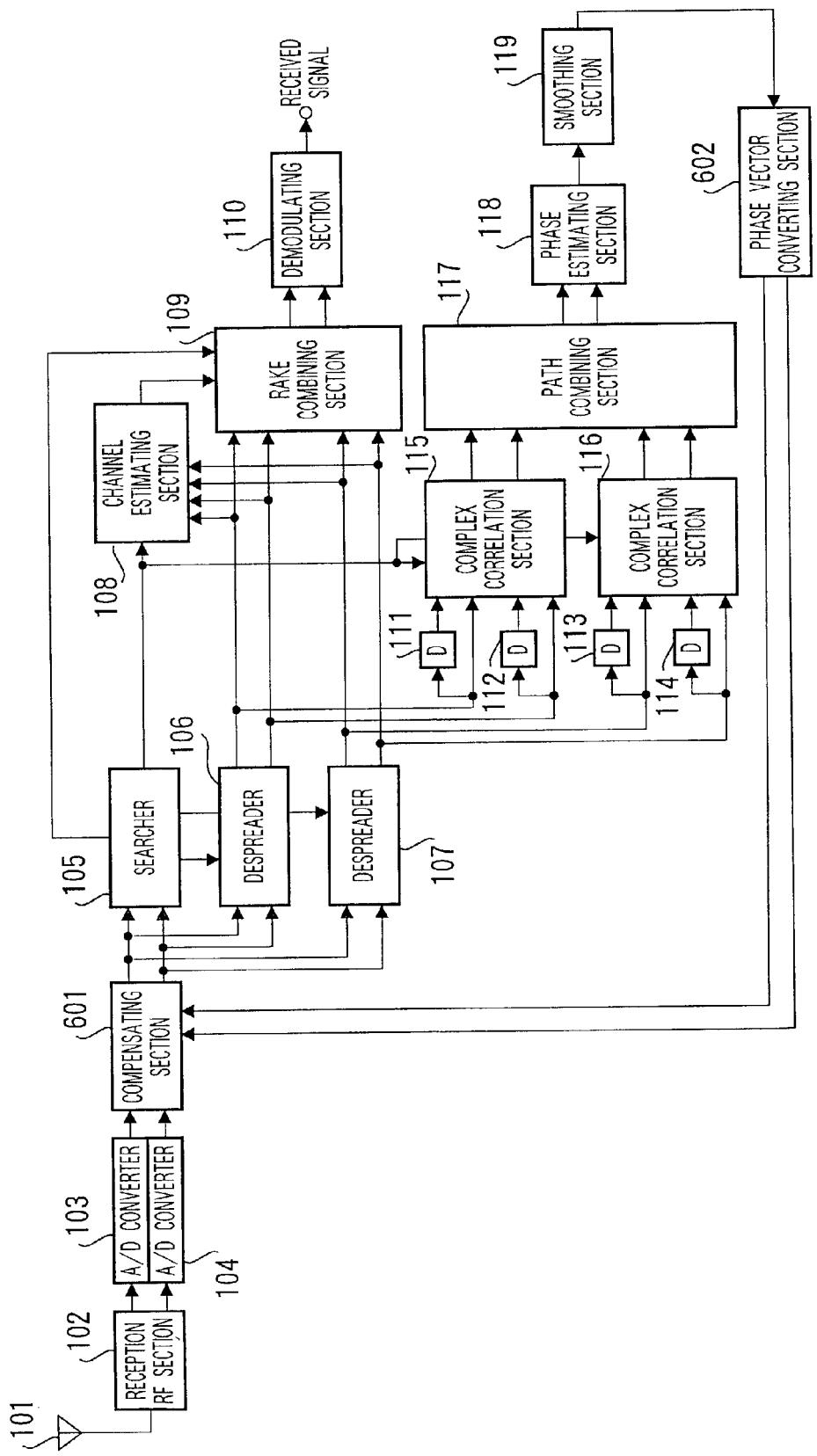
FIG. 12 is a block diagram showing a configuration of a radio receiving apparatus according to Embodiment 2 of the present invention.

This embodiment explains a case in which compensation for frequency offset is implemented by software processing. FIG. 12 is a block diagram showing a configuration of a radio receiving apparatus according to Embodiment 3 of the present invention. In addition, some sections in the second embodiment illustrated in FIG. 12 are assigned the same symbols as those of corresponding sections in the first embodiment (FIG. 7) and its explanation is omitted.

The radio receiving apparatus of this embodiment has a configuration in which a compensating section 601 is provided between the A/D converters 103, 104 and the searcher 105 and the control voltage converting sections 120, 121, and the crystal oscillator 122 of the radio receiving apparatus of Embodiment 1 are removed, and a phase vector converting section 602 is provided.

The phase vector converting section 602 converts the phase rotation amount (φest(n) [radian]) of the nth slot subjected to smooth processing by the smoothing section 119 into a phase rotation vector. The phase rotation vectors calculated by the phase vector converting section 602, namely, phase rotation vector (rot(n).i) of I-ch and phase rotation vector (rot(n).q) of Q-ch are expressed by the equation given below. In this case, K is a compensation unit in which compensation is performed one time.

$$\begin{cases} rot(n) \cdot i = \cos\{K \cdot \hat{\phi}_{est}(n)\} \\ rot(n) \cdot q = \sin\{K \cdot \hat{\phi}_{est}(n)\} \end{cases}$$ [Equation 6]

The compensating section 601 provides compensation for frequency offset using the phase rotation vector of I-ch and Q-ch converted by the phase vector converting section 602 to the baseband signal with I-ch and the baseband signal with Q-ch from the A/D converters 103 and 104. More specifically, the baseband signal of k sample in nth slot is s(n,k).i from the A/D converter 103 and the baseband signal of k sample in nth slot is s(n,k).q from the A/D converter 104. The baseband signal (sc(n,k).i) with I-ch compensated by the compensating section 601 and the baseband signal (sc(n,k).q) with Q-ch compensated by the compensating section 601 can be expressed by the equation given below:

$$\begin{cases} sc(n,k) \cdot i = s(n,k) \cdot i \cdot \cos\{k \cdot \hat{\phi}_{est}(n)\} + \\ \qquad s(n,k) \cdot q \cdot \sin\{k \cdot \hat{\phi}_{est}(n)\} \\ sc(n,k) \cdot q = -s(n,k) \cdot i \cdot \sin\{k \cdot \hat{\phi}_{est}(n)\} + \\ \qquad s(n,k) \cdot q \cdot \cos\{k \cdot \hat{\phi}_{est}(n)\} \end{cases}$$ [Equation 7]

The baseband signal with I-ch compensated by the compensating section 601 and the baseband signal with Q-ch compensated by the compensating section 601 are afterward subjected to processing as explained in Embodiment 1.

In the aforementioned Embodiments 1 and 2, the carrier frequency used in the reception RF section 102 is directly controlled such that the crystal oscillator of the communication partner and that of the present radio receiving apparatus become the same as each other in the accuracy, and the phase rotation due to the frequency offset is compensated.

On the other hand, in the present embodiment, the phase rotation due to the frequency offset is compensated using digital signal processing of the baseband signal. According to the present embodiment, since this makes it possible to compensate for the frequency offset by software processing such as DSP, it is possible to make the compensation accuracy of frequency offset and the correction accuracy of crystal oscillator due to the control voltage unrelated to each other. Moreover, this can prevent deterioration in the receiving quality caused by the variations in the parts of the crystal oscillator.

In addition, the present embodiment has explained the case in which compensation for frequency offset in the radio receiving apparatus of Embodiment 1 is implemented by software processing. However, needless to say, compensation for frequency offset in the radio receiving apparatus of Embodiment 2 may be implemented by software processing.

In this case, there can be obtained an effect that can suppress deterioration in the phase estimation accuracy in addition to the aforementioned effect.

Moreover, though the above-mentioned Embodiments 1 to 3 has explained the case in which the number of paths to be handled is two, the present invention can be applied to a case in which the number of paths to be handled is three or more and a case in which the number of paths to be handled is one. In a case where the number of paths to be handled is one, RAKE combining section 109, despreader 107, delay section 114, complex correlation section 116, and path combining section 117 may be removed from FIGS. 7, 11, and 12. Additionally, in this case, it is possible to estimate the phase rotation amount by the phase estimating section 118 using the signal subjected to complex correlation processing by the complex correlation section 115. Furthermore, after the baseband signal subjected to the despread processing by the despreader 106 is multiplied by the inverse characteristic of the channel estimation value from the channel estimating section 108, received data can be extracted by the demodulating section 110 using the baseband signal multiplied by the inverse characteristic.

(Embodiment 4)

This embodiment will explain a case in which space diversity is used in Embodiments 1 to 3. Though space diversity can be applied to any one of Embodiments 1 to 3, a case in which space diversity is applied to Embodiment 1 will be first explained.

Figure 13:
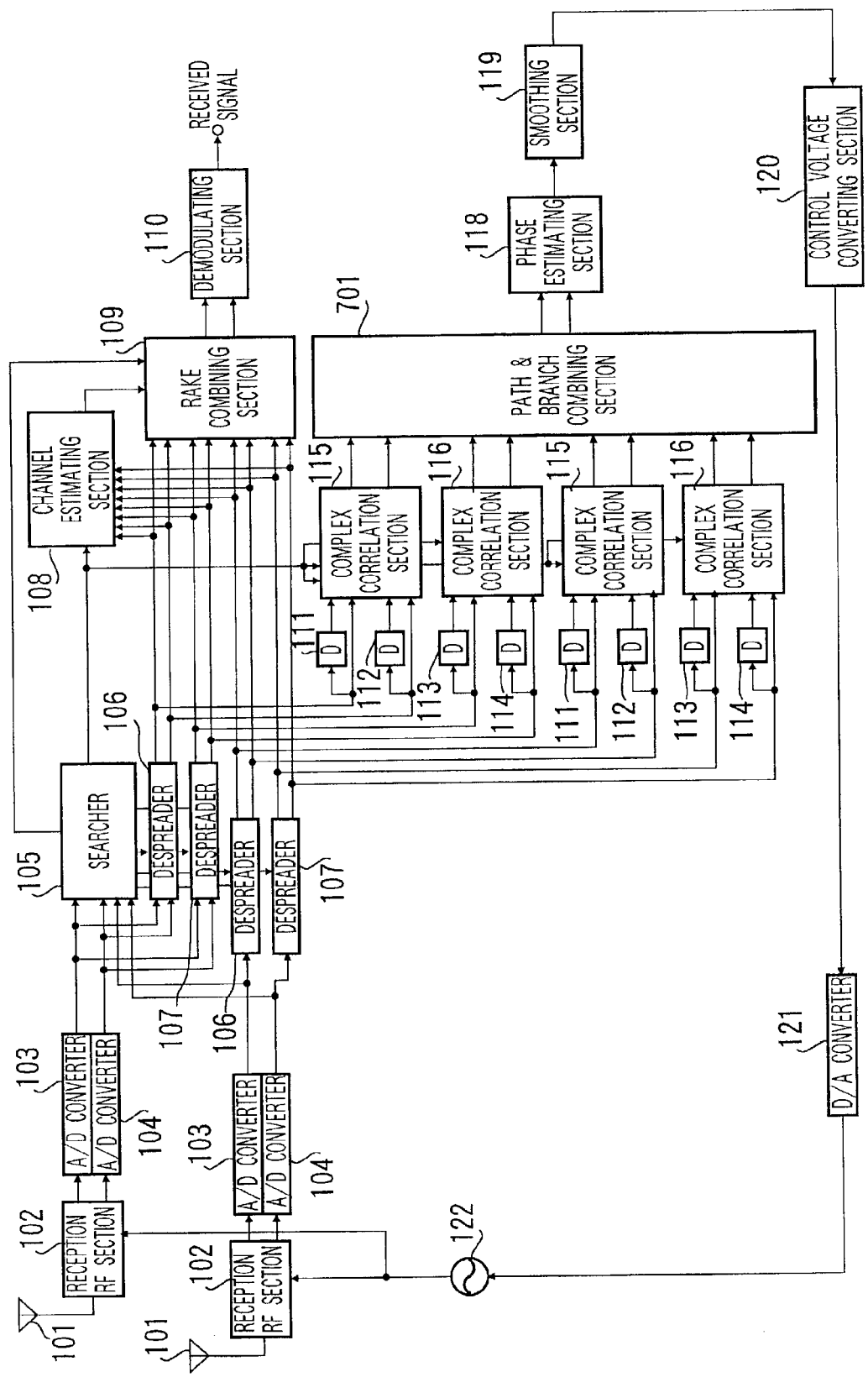
FIG. 13 is a block diagram showing a configuration of a radio receiving apparatus according to Embodiment 4 of the present invention.

FIG. 13 is a block diagram showing a configuration of a radio receiving apparatus according to Embodiment 4 of the present invention. In addition, some sections in the second embodiment illustrated in FIG. 13 are assigned the same symbols as those of corresponding sections in the first embodiment (FIG. 7) and its explanation is omitted.

The radio receiving apparatus of this embodiment has a configuration in which a receiving system of a plurality of branches (two branches as one example here) and a path & branch combining section 701 for the path combining section 117 are added to the radio receiving apparatus of Embodiment 1. In addition, the receiving system is one that includes antenna 101, reception RF section 102, A/D converter 102, A/D converter 103, searcher 105, despreader 106, despreader 107, delay sections 111 to 114, complex correlation section 115, and complex correlation section 116.

The path & branch combining section 701 performs combination of path and branch for each I-ch and Q-ch as shown in the equation set forth below. In this case, it is assumed that the output signals of complex correlators 111 to 114 of nth slot, br branch, pth path are set to C(n,br,p).

$$\begin{cases} C_{est}(n) \cdot j = \dfrac{1}{B \cdot P} \sum_{br=0}^{B-1} \sum_{p=0}^{P-1} C(n, br, p) \cdot i \\ C_{est}(n) \cdot q = \dfrac{1}{B \cdot P} \sum_{br=0}^{B-1} \sum_{P=0}^{P-1} C(n, br, p) \cdot q \end{cases} \quad \text{[Equation 8]}$$

The path & branch combining section 701 calculates the phase rotation amounts Cest (n).i and Cest (n).q due to the frequency offset of nth slot from the above equation.

In this way, according to this embodiment, it is possible to suppress noise that causes deterioration in estimation accuracy of the frequency offset by path diversity effect and space diversity effect. Particularly, at the time of performing a burst-like reception in which a sufficient average length required to suppress noise cannot be obtained, both path diversity effect and space diversity effect are reflected in the received signal, with the result that noise in the received signal can be sufficiently suppressed even if the number of samples of received signals is small.

Additionally, in the case where space diversity is applied to Embodiment 2 (FIG. 11), the signals obtained by the path & branch combining section are smoothed for each I-ch and Q-ch and the phase rotation amount is estimated using the respective smoothed signals, making it possible to obtain an effect that can suppress the phase estimation accuracy due to noise in addition to the aforementioned effect. Accordingly, it is possible to obtain a stable reception quality as keeping the frequency offset accuracy more stable even when the burst-like reception is performed.

Moreover, in the case where space diversity is applied to Embodiment 3 (FIG. 12), by compensating for the phase rotation due to the frequency offset using digital signal processing to the baseband signal, there can be obtained an effect that makes the compensation accuracy of frequency offset and the correction accuracy of crystal oscillator due to the control voltage unrelated to each other in addition to the aforementioned effect. Moreover, this can prevent deterioration in the receiving quality caused by the variations in the parts of the crystal oscillator. In this case, at the time when the signals obtained by the path & branch combining section are smoothed for each I-ch and Q-ch and the phase rotation amount is estimated using the respective smoothed signals, there can be obtained an effect that can suppress the phase estimation accuracy due to noise in addition to the aforementioned effect.

As is obvious from the above explanation, according to the radio receiving apparatus of the present invention, complex correlation processing is provided to a received signal, which is not yet subjected to path combining, on a path-by-path basis, and a phase rotation amount is estimated from the received signal subjected to complex correlation processing, making it possible to correctly estimate the phase rotation amount due to a frequency offset even at a high-speed moving time.

This application is based on the Japanese Patent Application No. 2000-261816 filed on Aug. 30, 2000, entire content of which is expressly incorporated by reference herein.

INDUSTRIAL APPLICABILITY

The present invention is suitable for a radio communication apparatus.

The invention claimed is:

1. A radio receiving apparatus comprising:
    a despreading section that provides despreading processing to received signals to extract in-phase components and quadrature components of received signals of predetermined paths;
    a RAKE combining section that combines the in-phase components and quadrature components of the despread received signals of predetermined paths;
    a complex correlation processing section that provides complex correlation processing to the in-phase components and quadrature components of the despread received signals of predetermined paths;
    a path combining section that combines the despread received signals of predetermined paths subjected to the complex correlation processing per in-phase component and quadrature component to generate in-phase components and quadrature components of combined signals; and a phase rotation calculating section that calculates a phase rotation amount in the received signals using the generated in-phase components and quadrature components of the combined signals.

2. The radio receiving apparatus according to claim 1, wherein the complex correlation processing section provides the complex correlation processing to the in-phase components and quadrature components of the received signals of predetermined paths per predetermined path.

3. The radio receiving apparatus according to claim 1, wherein:
the phase rotation calculating section comprises a smoothing section that provides smoothing processing to the calculated phase rotation amount; and
the smoothed phase rotation amount is used as a new phase rotation amount.

4. The radio receiving apparatus according to claim 1, wherein the phase rotation calculating section comprises a smoothing section that provides smoothing processing to the generated combined signals to calculate the phase rotation amount using the combined signals subjected to the smoothing processing.

5. The radio receiving apparatus according to claim 1, further comprising:
a frequency offset calculating section that calculates a frequency offset using the phase rotation amount calculated by the phase rotation amount calculating section; and
a compensating section that controls a frequency of a local signal based on the calculated frequency offset to compensate for a frequency offset in the received signals.

6. The radio receiving apparatus according to claim 1, further comprising:
a frequency offset calculating section that calculates a frequency offset using the phase rotation amount calculated by the phase rotation amount calculating section; and
a compensating section that provides digital calculating processing to the received signals using the calculated frequency offset to compensate for the frequency offset in the received signals.

7. The radio receiving apparatus according to claim 1, wherein the despreading section extracts the in-phase components and quadrature components of the received signals of predetermined paths from among the received signals of a plurality of branches.

8. A communication terminal apparatus comprising a radio receiving apparatus, the radio receiving apparatus comprising:
a despreading section that provides despreading processing to received signals to extract in-phase components and quadrature components of received signals of predetermined paths;
a RAKE combining section that combines the in-phase components and quadrature components of the despread received signals of predetermined paths;
a complex correlation processing section that provides complex correlation processing to the in-phase components and quadrature components of the despread received signals of predetermined paths;
a path combining section that combines the despread received signals of predetermined paths subjected to the complex correlation processing per in-phase component and quadrature component to generate in-phase components and quadrature components of combined signals; and
a phase rotation calculating section that calculates a phase rotation amount in the received signals using the generated in-phase components and quadrature components of the combined signals.

9. A radio receiving method comprising:
despreading received signals to extract in-phase components and quadrature components of received signals of predetermined paths;
RAKE combining the in-phase components and quadrature components of the despread received signals of predetermined paths;
complex correlation processing the in-phase components and quadrature components of the despread received signals of predetermined paths;
path combining the complex correlation processed signals per in-phase component and quadrature component to generate in-phase components and quadrature components of combined signals; and
calculating a phase rotation amount in the received signals using the in-phase components and quadrature components of the generated combined signals.

* * * * *